Figure 1:
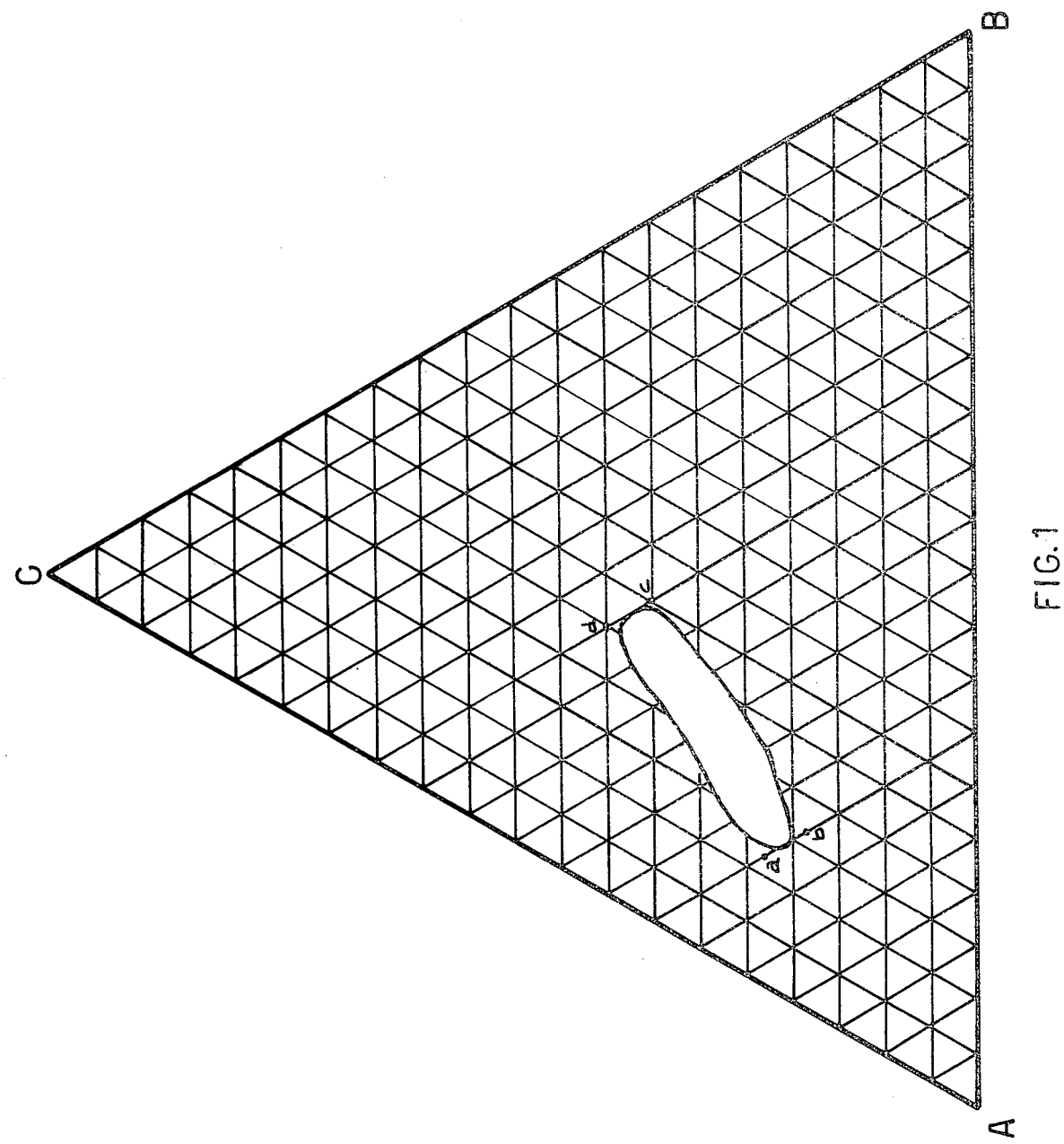

United States Patent [19]

Buonomo et al.

[11] 3,929,681
[45] Dec. 30, 1975

[54] CATALYTIC COMPOSITIONS USEFUL FOR THE OXIDATION OF CARBON MONOXIDE AND HYDROCARBONS AND THE PROCESS FOR PREPARING THEM

[75] Inventors: Franco Buonomo; Vittorio Fattore; Gianfranco Zanoni; Bruno Notari, all of San Donato Milanese, Italy

[73] Assignee: Snam Progetti S.p.A., San Donato Milanese

[22] Filed: Sept. 1, 1972

[21] Appl. No.: 285,652

[30] Foreign Application Priority Data
Sept. 2, 1971 Italy.................................. 28155/71
July 18, 1972 Italy.................................. 27097/72

[52] U.S. Cl.............. 252/465; 252/466 J; 252/467; 252/470; 252/471; 252/474; 423/213.2; 423/213.5

[51] Int. Cl.[2] . B01J 23/72; B01J 23/84; B01J 23/86

[58] Field of Search......... 252/465, 466 J, 467, 471, 252/474, 470; 423/213.2, 213.7, 213.5

[56] References Cited
UNITED STATES PATENTS

| 2,025,140 | 12/1935 | Wenzel | 423/213.2 |
| 2,031,475 | 2/1936 | Frazer | 423/213.2 |
| 2,071,119 | 2/1937 | Harger | 423/213.2 |
| 3,133,029 | 5/1964 | Hoekstra | 423/213.2 |
| 3,259,453 | 7/1966 | Stiles | 423/213.7 |
| 3,295,918 | 1/1967 | Briggs et al. | 423/213.5 |
| 3,397,154 | 8/1968 | Talsma | 252/463 |
| 3,493,325 | 2/1970 | Roth | 252/465 X |
| 3,669,906 | 6/1972 | Koberstein et al. | 252/466 J |
| 3,737,396 | 6/1973 | Negra et al. | 252/466 J |

FOREIGN PATENTS OR APPLICATIONS
662,460    12/1951    United Kingdom............. 423/213.2

*Primary Examiner*—W. J. Shine
*Attorney, Agent, or Firm*—Ralph M. Watson, Esq.

[57] ABSTRACT

A new series of compounds, represented by the formula: $Cu, Mn_x Me_y Cr_z O_w$, wherein Cu = copper, Mn = manganese, Me = nickel or cobalt, Cr = chromium, O = oxygen; $x$ is a number from 1 to 2, inclusive, and zero when Me is Ni and $y$ and $z$ are not zero; $y$ is a number from 1 to 6, inclusive, and zero when $x$ and $z$ are not zero; $z$ is a number up to 3, and zero when Me is Co and $x$ and $y$ are not zero; $w$ is the index of oxygen which satisfies the valencies of the metals, having regard for their indices in the formula, that are useful as catalysts in the oxidation to $CO_2$ and $H_2O$ of carbon monoxide and hydrocarbons contained in the exhaust gases of internal combustion engines, the preparation and the pretreatment thereof are disclosed.

13 Claims, 2 Drawing Figures

CATALYTIC COMPOSITIONS USEFUL FOR THE OXIDATION OF CARBON MONOXIDE AND HYDROCARBONS AND THE PROCESS FOR PREPARING THEM

The present invention relates to catalytic compositions useful for oxidizing carbon monoxide and saturated and unsaturated hydrocarbons to $CO_2$ and $H_2O$.

More particularly it concerns catalytic compositions for the oxidation of the exhaust gases of the internal combustion engines of the Diesel or Otto-cycle type.

A further subject of this invention is the process for the preparation of the particular compositions of the catalysts we have invented.

From another point of view another further object comprises the process of complete combustion of a mixture containing carbon monoxide and residues containing carbon and partially burned hydrocarbons through their conversion, into carbon dioxide and water by utilizing the catalytic compositions of the invention.

The problem of the oxidation of carbon monoxide concerns many fields of the chemical industry. Therefore, from a certain time more or less valid solutions have been studied for this type of reaction.

Recently the problem has been approached also from the point of view of pollution. In some particular cases this aspect is worrying. When the fact is considered that, in the case of the internal-combustion engines, exhaust gases are produced containing carbon monoxide which, after a prolonged operation of the engines and by virtue of the large number of them, can constitute a remarkable part of the carbon monoxide discharged into the atmosphere, it is possible to have an idea of the dangerous situation both for mankind and for the atmosphere. This situation is getting worse and worse. According to an estimate recently carried out in the U.S.A. in the area of Los Angeles alone each day there are discharged into the atmosphere 2500 tons of organic products, 8000 tons of carbon monoxide and 700 tons of nitrogen oxide; 70% of said organic substances, 50% of nitrogen oxides and practically 100% of carbon monoxide are coming from the exhaust pipes of the internal combustion engines of automobiles. Anyway it is sure that the present situation is becoming critical and wide alarm is justified considering the damages caused by all these substances which directly or indirectly are present in the exhaust gases of the motor cars.

Among these gases the most dangerous for its high toxicity, is surely carbon monoxide: 4000 ppm in the atmosphere are sufficient to cause the death of a person in less than one hour.

The hydrocarbons, in combination with the nitrogen oxides are responsible for the formation of the photochemical smog which forms during the day time in the metropolitan areas having a poor natural ventilation; the damages caused by this particular type of fog appear on some types of vegetation, the same also exerts a harmful action towards man causing inflammation of the eyes and respiratory tract.

A broad search has been carried out on the formation mechanism of this fog and already it has been shown that the primary mechanism is the photodissociation of the nitrogen dioxide ($NO_2$) with formation of nitric oxide (NO) and of atomic oxygen (O). These react with the products of partial combustion of the hydrocarbons present in the atmosphere originating peroxyacylnitrates and $O_3$ which have a strong toxic action against the vegetation and at the same time an inflammatory action.

Limitation of the concentration of all these substances in the atmosphere and intervention against the main pollution source has been engaged the attention of all those industries, which have interest direct or indirect in the solution of the problem.

The searches, with this in view, have developed in the last 20 years, along four directions 1. homogeneous post-combustion
2. catalytic converters
3. modifications of the systems of feeding and ignition
4. modifications of the engines in combination with the composition of the gasolines.

It has already been confirmed experimentally that, while it is possible to succeed to a limited degree in reducing the emission of pollutants by modifying the systems of feeding and igniting fuel, and also by modifying the composition of the fuel, it is only through post-combustion, either homogeneous or catalytic, that acceptable limits are obtained, and in particular it is, only with suitable catalytic converters that the established limits of emission foreseen for 1980 by the U.S.A. legislation may be reached.

The utilization of suitable catalytic converters seems to constitute a solution which is particularly advantageous for the purification of the exhaust gases of the internal combustion engines: in fact the device necessary for the solution of the problem has very reduced dimensions, has a low cost, may operate under all running conditions of the engine from a low number of revolutions and when it is cold, to a high number of revolutions and when the engine is hot, in mixed and very different circumstances.

In any case it is to be borne in mind that the catalytic converters are traversed by hot exhaust gases under conditions which, as reported before, are very variable from a physical point of view, for instance by the thermal one, and from the point of view of the compositions of the mixtures wherein the components may vary qualitatively and quantitatively.

In addition to carbon monoxide there are present in certain amounts, hydrocarbons and other organic products and therefore the catalysts must be such as to ensure that also these compounds have to be highly oxidized to carbon dioxide and water for the purpose of efficaciously diminishing the amounts of them discharged into the atmosphere.

What we have above reported gives a sufficient idea of the extreme complication of succeeding in obtaining active catalytic compositions under operative conditions so different and difficult. On the other hand even if these compositions were really obtained, their practical use would be still conditioned by the fact that they must present good mechanical properties besides presenting the catalytic ones, because from the point of view of the cost the endurance constitutes a heavy item; if good catalytic and mechanical properties were maintained for only a short time a very frequent change would cause considerable increase in the operating cost. The art has proposed a large number of solutions for this problem though no one of them has been practically realized.

The prior art suggests in fact substantially the use of the noble metals like platinum or in the alternative numerous mixtures of oxides of different metals.

While the use of platinum is mainly tenable for the great activity of this metal with respect to the oxidation reactions, this advantage contrasts with the great sensitivity of platinum to poisons, its high cost, the necessity to recover it from the exhausted catalysts and the necessity of having large amounts of it for a generalized use on the cars which mainly contribute to the atmospheric pollution. It is therefore a problem to decide on the practical possibility of utilizing such metal and to establish if really by weighing the pros and cons the result is positive or not.

Alternatively searches in the field of mixtures of oxides different from platinum, were effected, which do not require the recovery and have substantially no problems of cost; they are less sensitive than the platinum to the poisons, even if their performance is not always equal to the performance of the platinum catalysts.

Also for these catalysts up to this time, it has been difficult to find solutions which allowed their use in conditions which are economically acceptable. On the other hand potentially the most promising catalytic compositions would have to be constituted just by mixtures of oxides. For this reason many patents are addressed to numerous combinations of oxides, as active part, generally carried on known supports.

From U.S. Pat. Nos. 3,230,182, 3,230,034, 3,202,618 and also from British Pat. Nos. 986,934 and 1,136,021 and French Pat. No. 1,466,134 numerous combinations of metal oxides are known running as active part, in general suitably supported on gamma-alumina and subjected also to suitable treatment.

The wealth of literature existing in the field is due, not only to the numerous possibilities of the combinations obtainable through the different oxides, but also to the extreme complication in setting up catalysts having both high catalytic activity and the best mechanical characteristics, stable for a sufficient length of time, when it is well known that numerous factors may affect the catalysts, such as the ratio of the components, the preparation method of the catalyst, the nature of the carrier, the treatment to which they were subjected during the preparation and so on. In this sense the compositions of the prior art, sometimes for one reason sometimes for another, do not ensure at the same time all the required properties.

Now we have found some catalytic compositions which possess at once and completely all the necessary requirements.

We in fact have found compositions which present the best properties in the oxidation reaction of carbon monoxide and of the hydrocarbons, particularly when utilized for the oxidation of the exhaust gases of internal combustion engines; we found also a carrier capable of giving to such catalytic compositions the best mechanical properties and we have also found a treatment of the carrier before linking to it the catalytic composition, so that as a final result a catalyst of low cost is obtained which also ensures, in the particular case of the exhaust gases of engines, a high oxidation of the carbon monoxide and hydrocarbons, stable under the different conditions of the operation of the same engine and extended in time.

It is also to be borne in mind that the oxidation of the exhaust gases represents a particular case, generally taking place under conditions with a negligible possibility for control, of the oxidation gases which, generally contain partially burnt products like carbon monoxide.

So while in the treatment of the exhaust gases the preferred practice of the invention is carried out with the use of catalysts supported on pretreated carrier, in other cases the catalyst can be used supported without pretreating or only the catalytically active metal oxycompounds without the carrier. Therefore this invention is not to be construed as limited to only the oxidation of the exhaust gases, even if said oxidation at the present represents its most interesting aspect.

Catalytic Compositions of the invention (active part)

The compositions of the invention are represented by the following formula:

$$Cu\ Mn_x\ Me_y\ Cr_z\ O_w \quad (I)$$

wherein Cu = copper, Mn = Manganese, Me = a metal of the VIII group selected from Nickel and Cobalt, Cr = Chromium, O = oxygen; while $x$ represents a number between 1 and 2, comprising the extreme ends, namely also O, when Me is Ni while $y$ and $z$ are different from zero; $y$ a number between 1 and 6, comprising the extreme ends namely also O while x and z are different from zero; $z$ represents a number up to 3, preferably 3, namely also O when Me is Cobalt while $x$ and $y$ are different from zero; w is the index of Oxygen to satisfy the valencies of the metals, taking into account the indices wherewith they are represented in the formula.

The formula above reported comprises ternary mixtures, in the sense that they may be considered as constituted by three different oxides having among them different but well determined ratios.

In the case $x = O$ there are present in the composition Chromium, Copper and Nickel according to the formula (derived from the I)

$$Cr_z\ CuNi_{1-6}\ O_w \quad \text{I a}$$

a characteristic compound being
a. $Cr_3\ CuNi_{1.4}\ O_w$
In the case of $y = O$ Formula I becomes $$Cr_z\ CuMn_{1-}\ O_w \quad \text{I b}$$

a characteristic compound being
b. $Cr_3\ CuMn\ O_w$
When $Z = O$ Formula I becomes $$CuMn_{1-2}\ Co_{1-6}\ O_w \quad \text{I c}$$

In said formula c) there are comprised all the compounds of the area $a\ b\ c\ d$ of the FIG. 1 ternary diagram, wherein the vertices A B C represent respectively 100% atoms of Co, 100% atoms of Cu and 100% atoms of Mn. With reference always to FIG. 1 in $a$ is represented the composition $Mn_{2.3}Co_{6.5}Cu_{1.2}$
in $b$ is represented the composition $Mn_{1.8}Co_{6.5}Cu_{1.7}$
in $c$ is represented the composition $Mn_{3.5}Co_{3.5}Cu_3$
in $d$ is represented the composition $Mn_4\ Co_{3.5}Cu_{2.5}$ It is thus seen that the area which represents useful active compositions is very restricted with respect to that of all the possible compositions.

All the compositions of the invention show a remarkable activity in the oxidation of carbon monoxide also in the presence of hydrocarbons and over a broad range of operative conditions (temperatures, pressures). In particular the named compositions are in the position to start the oxidation of CO already at 45°C and GHSV (Gas Hourly Space Velocity) of 27.000 hours$^{-1}$, and possess thermal and mechanical stability sufficient for their practical utilization in catalytic mufflers.

The compositions may be considered mixtures of oxides with oxygenated compounds of the salt type or compounds of the salt type. The crystal structure of said materials is not known but it appears extremely complex and it is impossible at the present state of the art to establish a valid relation between the structure of these materials and their catalytic properties. This fact shows the originality of the present invention.

PREPARATION OF THE COMPOSITIONS OF THE INVENTION

The preparation of the catalytic compositions of formula I "per se" presents no difficulty and may be carried out according to any known method. In the preferred practice of the invention, the starting products are compounds which are soluble in the medium to which they are introduced by dissolving amounts of them in such proportions as to ensure their presence in the final product exactly according to the ratios of said formula I. The solution so obtained is treated in such a way that all the solvent is removed leaving a solid residue: the latter at the end is treated in such a way that only the metals which must be present in the active part and the oxygen linked to them remain in the final product, removing therefore all the elements which do not appear in formula I.

The most suitable solvent is water and when utilizing it, the compounds of the metals must be selected from the ones soluble in water. This selection is not a problem. Therefore in the case of Chromium it is possible to resort to any soluble salt, for instance to the acetate or nitrate and the same will be true for the cobalt, nickel, manganese and copper which can be introduced during the reaction, for instance, as nitrates, acetates and so on.

As to the treatment of the solution comprising all the metal compounds which have to form the active part, also in this case there are no problems, since the prior art offers different solutions. It is possible therefore to resort to a thermal treatment for drying the solution. When said solution is a water solution it is sufficient to maintain it at 80°–120°C for the time necessary to remove the water or to atomize it in a suitable atomizer obtaining the product dried as a dust. Also the following treatment may be a thermal treatment, which serves to insure the presence in the final compound of only metals and oxygen linked therewith by removing the undesired other elements. In this case nitrogen oxides are removed by heating to a temperature of about 250°C and the solid residue is calcined at temperatures between about 500° and 800°C. The time required by this last treatment may range over very wide limits, but a time of about 2 hours generally is sufficient.

Obviously by varying the solvent or the starting compounds of the metals the treatment for obtaining the active part may correspondingly vary but this may take place according to conventional methods.

Even if the active part were not utilized as such but it were desirable to resort to the aid of a carrier, which is often necessary, then when the preparation of a single solution is accomplished the impregnation of the carrier will be performed and afterwards the operations of drying and of calcination will follow.

CARRIER FOR THE CATALYTIC COMPOSITIONS OF THE INVENTION

Not all the compounds known to be useful as carriers may be utilized according to this invention. The carrier of the invention, which must be subjected to impregnation with the single solution of the active part, must possess a high mechanical stability, a low density, a large surface area and a high thermal stability: preferably the geometrical shape must be a spheroid since in such a case the surface friction of the particles is reduced to a minimum.

The spheroid carriers based on silica, silica-alumina and on alumina containing variable amounts of other elements will meet such requirements.

A type of material which appeared particularly useful for supporting the formula I compositions is the one described and characterized in the U.S. Pat. No. 3,416,888, issued to the assignee of this application, constituted by gamma alumina with a large surface area.

PREPARATION OF THE CARRIER FOR THE CATALYTIC COMPOSITIONS OF THE INVENTION

The method of preparation of the carrier is substantially the same as the one described in the U.S. Pat. No. 3,416,888.

Some expedients however permit improvement in some properties in the final product according to its particular end use. A mixture of ammonium acetate, aluminum chloroxydroxide and an aqueous solution of gelling material is brought to the temperature of −5°C and dripped into a column containing a liquid such as oil which is immiscible with it and which is maintained at the temperature of 90°C. Spheroidal particles of alumina gel thus formed are recovered from the bottom of the column and subjected to treatment with gaseous ammonia at 90° for several hours. They are then washed with ammonia water (pH 9–11) at 90°C for a period of from 1 to 5 hours and are then subjected to a controlled crystallization in ammonia water (pH 9–11) at 90°C. The spheroidal particles of alpha monohydrate thus obtained are dried in an oven and calcined, providing gamma alumina with a large surface area. Particular care must be observed in controlling the temperature at which the washing and crystallization are carried out, the pH of the ammoniacal solution which is used and the period during which crystallization occurs.

The best mechanical properties of spheroidal alumina having a low specific gravity are obtained by selecting suitable values of the above mentioned parameters.

A further improvement of the thermal properties of such materials may be obtained through the addition in the most suitable way of stabilizing elements such as $SiO_2$ $TiO_2$ $ZrO_2$ and so on.

PREPARATION OF THE SUPPORTED CATALYSTS

The carrier is treated with only the solution where the compounds of the metals are present in the ratios, corresponding to the formule I, then it is dried completely and subsequently it is calcined at a temperature lower than the one of sinterization of the carrier itself preferably between 500° and 800°C. When the catalytic compositions are supported, there is often a decrease of the catalytic activity with respect to that of the unsupported catalyst which in some case does not compromise the possibility of utilization but in other cases gives inferior results.

It has been found that it is possible substantially to maintain the best properties of the catalytic compositions of the invention also in preparation of the supported catalysts when the carriers are subjected to a particular treatment of preimpregnation.

PRE-IMPREGNATION OF THE CARRIER ACCORDING TO THE INVENTION

This stage has a practical influence on the activity and the stability of the catalyst. It consists in pre-impregnating the carrier with a solution of soluble compounds of bivalent metals or of chrome. As preferred bivalent metals there are mentioned copper of group I, manganese of group VII, nickel and cobalt of group VIII.

It is also preferable that the pre-impregnation takes place with solutions of copper compounds, nickel, manganese, and chrome when the active parts correspond to the formulas a), and b) while for the compounds of formula c) pre-impregnations with compounds of cobalt and copper. The pre-impregnation is an operation which is easily performed through the conventional techniques and will be illustrated in the examples. The stage of pre-impregnation is then followed by an impregnation which has the purpose of depositing the active part on the carrier which has been above described.

At this point it is apparent that our invention is concerned with: (a) only catalytic compositions (active parts) of the best catalytic properties; (b) their combination with the carrier as above defined so as to supply supported catalysts with good catalytic properties and of the best mechanical properties; (c) the catalytic compositions, combined with the carrier as defined, but pre-impregnated, in this last case good catalytic and mechanical properties are obtained; and finally (d); processes which utilize said chemical compositions or said combinations.

METHOD FOR THE EVALUATION OF THE CATALYTIC ACTIVITY

The catalytic compositions of the invention were evaluated as to their catalytic activity both in laboratory and by means of motor vehicles. In every case it has been observed that they present the characteristics of maintaining a constant activity at all times without losing their good physical qualities. Same catalysts for tests on motor vehicles, derived from the first compositions, prepared by us, are periodically discharged from the cars for subjecting them to control analysis: they still show the same initial properties. The catalysts are again placed on the cars and the tests are continued. As far as the evaluations of the properties are concerned, the following is pertinent:

In the laboratory tests an inox steel tube microreactor is used, having an internal diameter of 9 mm and a length of 320 mm; to the reactor is fed 1 cc of catalyst with a granulometry of 4.— 100 mesh (ASTM) which is arranged in the final part of the reactor; the initial part is filled up with granules of quartz, and represents the preheating zone of the gases. The reactor is dipped in an electrical oven which provides the heating of the only zone of the reactor filled with quartz which is above the catalyst.

A mobile thermocouple makes possible the measurement of the temperature at every point in the catalytic bed and in the pre-heating zone. The microreactor is fed with synthetic mixtures constituted by $CO$, $CO_2$, $N_2$, $O_2$ and $C_4H_{10}$ in concentrations about equal to those which may be found in the exhaust gases of internal combustion motor vehicles. A sampling valve permits taking gases entering and leaving the reactor and sending them to the analysis system constituted by a couple of gas-chromatography analysers with filaments and flame which effects the separation and the determination of the substances in question. $CO$, $CO_2$, $N_2$ and $O_2$ are separated on columns of silica gel and 5A molecular sieves, disposed in series on a filament gas chromatography analyser; $C_4H_{10}$ is analysed with a flame ionization detector. By means of the variation of the composition of the exit gases with respect to that of the entering gases are obtained the conversion values of the $CO$ and $C_4H_{10}$ to $CO_2$ and $H_2O$. The gas is sent to the catalyst at a space velocity of 27.000 $h^{-1}$, at a pressure which is almost room pressure. A typical gaseous mixture used for the catalytic tests has the following composition by volume:

| | |
|---|---|
| $CO$ | 3% |
| $CO_2$ | 15% |
| $O_2$ | 2.5% |
| $C_4H_{10}$ | 700 ppm |
| $N_2$ | balance |

For the determination of the levels of emission measured at the exit of the catalytic mufflers fixed on cars, procedures, sampling apparatuses and gas analysis are used according to Standards and described in detail in the "Control of Air Pollution from new motor vehicles and new motor vehicles engines" issued in the Federal Register Vol. 33 No. 108, June 1968, Part II.

Practically the motor vehicle must follow a running cycle which simulates various speeds, accelerations decelerations; the cycle is standardized and corresponds to the "1971 U.S.A. cycle (7-mode cycle)". During the cycle performance the emission values are read, which through a suitable elaboration originate the final values of unburnt hydrocarbons and of carbon monoxide emitted during the exhaust phase.

Likewise, operations may be conducted according to "Europa cycle (W/Trans/WP 29 -Text agreed in the meeting WP 29 of Geneva of the 17$^{th}$–21$^{st}$ Mar., 1969; "Prescriptions uniformes a l'homologation des vehicules et equipes des moteurs a allumage comande en ce qui concerne les emissions des gas polluants par les moteurs") .

PROCESSES OF OXIDATION ACCORDING TO THE INVENTION AND RANGE OF THE SAME INVENTION

The process consists simply in feeding mixtures containing carbon monoxide in any ratio and/or other compounds as for instance hydrocarbons together with an oxidizing agent (for instance oxygen or air) on a catalyst (supported on a carrier pre-impregnated or also unsupported) as defined in the present invention.

A particular case of remarkable practical interest, but not limitative of the invention, is the above mentioned relative to the feeding of the exhaust gases of the internal combustion engines in a catalytic zone (muffler) where the catalysts of the invention supported or unsupported are present.

For this purpose, as the feeding of the engine, types of gasolines may be employed, of different antiknocking power (commercially characterized by means of the octane number) which may, or may not, contain additives based on lead, particularly tetraethyl lead and/or tetramethyl lead. The use of gasolines not containing additives based on lead is preferred, because the lead additives originate, after combustion, solid oxy-compounds of lead which deposit on the catalyst and may be prejudicial to the activity in the long run.

All these inconveniences are on the contrary eliminated through gasolines devoid of lead. However, the catalysts of the present invention may be utilized also with gasolines containing lead additives, and particularly with gasolines suitably formulated for which the quantities by weight of lead additives may be reduced with respect to the present levels of 0.6 – 0.8 cc of TEL/liter (Tetraethyl lead/liter).

The oxidation process of the exhaust gases of motor vehicles is illustrated in detail in the present specification but it is obvious that the invention has a wider range.

The possibility that it offers of obtaining results which are particularly good under conditions of work as severe and drastic as in the case of internal combustion engine exhaust gases gives an indication of the possibilities which it may offer under conditions of easier control of the factors in the general field of oxidation even if in some cases it may be necessary to resort to some special trivances or variations to adjust the practice of the invention to different situations.

The following examples serve to better illustrate the invention without any limitation.

EXAMPLE 1

A catalyst was prepared based on only active oxy-compounds according to the following procedure. 46.8 g of a 50% Mn (NO$_3$)$_2$ solution were added to another solution containing, dissolved in 200 cc of H$_2$O 24.2 g Cu (NO$_3$)$_2$ . 3 H$_2$O and and 116.4 g Co (NO$_3$)$_2$ . 6 H$_2$O A solution was obtained which was completely dried by heating up to 120°C.

After eliminating nitrous vapours at 250°–300°C, the resulting solid material was calcined at 500°C for 2 hours.

A catalyst was obtained with the following formulation:

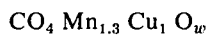

1 cc of such catalyst, having a granulometry comprised between 40 and 100 mesh ASTM was introduced into an integral flow, fed with a space velocity of 27.000 G.H.S.V. with a mixture containing by volume:

| | |
|---|---|
| CO | 2% |
| O$_2$ | 2% |
| C$_4$H$_{10}$ | 1000 ppm |
| CO$_2$ | 18% |
| N$_2$ | balance |

A resume of the performance of the catalyst is contained in the following table:

| Temperature measured on the gases entering the reactor | % CO converted a) | % C$_4$H$_{10}$ converted b) |
|---|---|---|
| 45°C | 45 | 15.1 |
| 51°C | 100 | 27.1 |
| 65°C | 100 | 37.8 |
| 93°C | 100 | 60.6 |

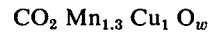

EXAMPLE 2

According to the method of preparation shown in example 1, a catalyst was prepared based on active oxycompounds, having a formulation corresponding to:

CO$_2$ Mn$_{1.3}$ Cu$_1$ O$_w$ 1 cc of such catalyst having a granulometry comprised between 40 and 100 meshes ASTM was set into an integral flow microreactor of 27.000 GHSV with a mixture containing by volume:

| | |
|---|---|
| CO | 3.5% |
| O$_2$ | 3 % |
| C$_4$H$_{10}$ | 800 ppm |
| CO$_2$ | 15 % |
| N$_2$ | balance |

A resume of the performance of said catalyst is contained in the following table:

| Temperature measured on the gases entering the reactor | % CO converted | % C$_4$H$_{10}$ converted |
|---|---|---|
| 42°C | 98.2 | 0.8 |
| 59°C | 100 | 28.3 |
| 153°C | 100 | 78.9 |

EXAMPLE 3

Following the usual procedure, a catalyst was prepared based on oxy-compounds having a formulation corresponding to Co$_{5.5}$ Mn$_3$ Cu$_1$ O$_w$ 1 cc of said catalyst, having a granulometry comprised between 40 + 100 mesh ASTM, was set into an integral flow microreactor fed at a space velocity at 27.000 GHSV with a gaseous mixture containing by volume:

| | |
|---|---|
| CO | 3% |
| O$_2$ | 2.5% |
| C$_4$H$_{10}$ | 700 ppm |
| CO$_2$ | 15% |
| N$_2$ | balance |

A resume of the performance of said catalyst is contained in the following table:

| Temperature measured on the gas entering the reactor | % CO converted | % $C_4H_{10}$ converted |
| --- | --- | --- |
| 74°C | 7.1 | 0 |
| 80°C | 98.1 | 33.1 |
| 94°C | 100 | 45.1 |

This example shows that the formulations from which are not within limits of the range, defined in the text, of the ternary system Co - Mn - Cu possess less high catalytic activities.

EXAMPLE 4

Always according to the method described in the example 1, a catalyst was prepared based on pure oxycompounds having a formulation corresponding to $$Co_{1.5} Mn_7 Cu_{1.5} O_{17.8}$$

1 cc of such catalyst having a granulometry comprised between 40 and 100 mesh ASTM, was introduced into an integral flow microreactor fed at a space velocity of 27.000 G. H. S. V., with a gaseous mixture containing by volume

| | |
| --- | --- |
| CO | 3% |
| $O_2$ | 2.5% |
| $C_4H_{10}$ | 700 ppm |
| $CO_2$ | 15% |
| $N_2$ | balance |

A resume of the performance of this catalyst is contained in the following table:

| Temperature measured on the gas entering the reactor | % CO converted | % $C_4H_{10}$ converted |
| --- | --- | --- |
| 110°C | 20.1 | 1.3 |
| 120°C | 100 | 39.1 |
| 147°C | 100 | 58 |

Also this example shows that formulations from which are not within the limits of the range, defined in the text, of the ternary system Co - Mn - Cu, possess inferior catalytic activities.

EXAMPLE 5

A spheroidal gamma - $al_2O_3$ is utilized having a high surface area and a porosity comprised between 0.8 and 0.9 cc/g having a great abrasionresistance, obtained according to the process described in the U.S. Pat. No. 3,416,888.

The spheroidal alumina particles, having a diameter of 2.5 – 3 mm were impregnated with a single solution containing salts of Co, Mn and Cu according to the following procedure: 800 g of gamma $Al_2O_3$ are maintained under vacuum during half an hour then there is added a solution obtained by dissolving:

426 g of Co $(NO_3)_2$ . 6 $H_2O$
340 g of Cu $(NO_3)_2$ . 3 $H_2O$ in 1000 g of a solution of 50% Mn $(NO_3)_2$ added with 200 cc of $H_2O$.

After the solution has been completely absorbed by the gamma $Al_2O_3$ it was dried at 120°C for 12 hours, then it was calcined in an air atmosphere at 500°C for 2 hours. A catalyst was obtained containing about the 23% b.w. of oxides of Co, Mn and Cu (the atomic ratio of the elements was: $Mn_2 Cu_1 Co_1$). 1 cc of the catalyst so obtained was introduced into an integral flow microreactor fed at a space velocity of 27.000 GHSV with a gaseous mixture containing by volume:

| | |
| --- | --- |
| CO | 4% |
| $O_2$ | 3.5% |
| $C_4H_{10}$ | 700 ppm |
| $CO_2$ | 15% |
| $N_2$ | balance |

A resume of performance of the catalyst is contained in the following table:

| Temperature measured on the gas entering the reactor | % CO converted | % $C_4H_{10}$ converted |
| --- | --- | --- |
| 156°C | 44.2 | 0 |
| 162°C | 93.6 | 5.8 |
| 184°C | 100 | 13.6 |
| 248°C | 100 | 53.5 |

EXAMPLE 6

By utilizing the gamma-$Al_2O_3$ described in the text a catalyst according to the following procedure was prepared: 1000 g of spheroidal gamma-$Al_2O_3$ were maintained under vacuum for half an hour, then a solution was added, obtained by dissolving:

966 g Co $(NO_3)_2$ . 6 $H_2O$ 200 g Cu $(NO_3)_2$ . 3 $H_2O$ 391.5 g Mn $(NO_3)_2$ in solution at 50% added with 400 cc of $H_2O$ After the solution was completely absorbed by the gamma-$Al_2O_3$ it was dried at 120°C for 12 hours, then it was calcined in air for 2 hours.

A catalyst was obtained containing about 28% by weight of Co, Mn and Cu oxides (the atomic ratio being $Co_4 Cu_1 Mn_{1.3}$).

1 cc of the so prepared catalyst was introduced into an integral flow microreactor, fed at a space velocity of 27.000 GHSV with a gaseous mixture containing by volume:

| | |
| --- | --- |
| CO | 2% |
| $O_2$ | 2.5% |
| $C_4H_{10}$ | 1100 ppm |
| $CO_2$ | 20% |
| $N_2$ | balance |

A resume of the performance of the catalyst is contained in the following table:

| The temperature measured on the gas entering the reactor | % CO converted | % $C_4H_{10}$ converted |
| --- | --- | --- |
| 148°C | 52.2 | 2.1 |
| 166°C | 97.1 | 7.6 |
| 178°C | 100 | 13.5 |
| 220°C | 100 | 24.3 |
| 248°C | 100 | 48.6 |

EXAMPLE 7

1000 g of spheroidal gamma-$Al_2O_3$ were impregnated with a solution containing 483 g Co $(NO_3)_2$ . 6 $H_2O$ in 800 cc $H_2O$. After drying at 150°C for 12 hours the catalyst was calcined at 700°C during 2 hours. After cooling at room temperature it was impregnated with a solution prepared by dissolving:

483 g Co $(NO_3)_2 \cdot 6\ H_2O$ 200 g Cu $(NO_3)_2 \cdot 3\ H_2O$ 391.5 g Mn $(NO_3)_2$ in solution at 50% added with 400 cc water.

After the solution was completely absorbed by the gamma $Al_2O_3$ it was dried at 120°C for 12 hours, then it was calcined at 500°C during 2 hours.

A catalyst was obtained containing about 22% b.w. of Co, Mn and Cu oxides (the atomic ratio between the elements was $Co_4\ Cu_1\ Mn_{1.3}$).

1 cc of the so prepared catalyst was introduced into an integral flow microreactor at a space velocity of 27.000 GHSV with a gaseous mixture containing by volume:

| | |
|---|---|
| CO | 2.5% |
| $O_2$ | 2 % |
| $CO_2$ | 20 % |
| $C_4H_{10}$ | 1000 ppm |
| $N_2$ | balance |

A resume of the performance of the catalyst is contained in the following table:

| Temperature measured on the gas entering the reactor | % CO converted | % $C_4H_{10}$ converted |
|---|---|---|
| 135°C | 12.2 | 2.8 |
| 140°C | 100 | 12.6 |
| 193°C | 100 | 36.4 |
| 220°C | 100 | 55.9 |

About 2 kg of the same catalyst were introduced into a radial flow catalytic muffler (FIG. 2) disposed under the platform of a 1300 cc stroke capacity Alfa Romeo 1300 TI car. Supplementary air was introduced upstream of the muffler.

A resume of the performance of this catalytic device is contained in the following tables: (For the description of the muffler of FIG. 2 see example 10):

"TOTAL CYCLES U.S.A. 1971" (7-MODE CYCLE)

| | Exhaust gases analysis | |
|---|---|---|
| | a) THC ppm | % CO |
| Car without muffler | 1700 | 4.5 |
| Car with muffler and supplementary air injection | 82 | 0.08 | a. THC = total hydrocarbons

"HOT CYCLES U.S.A. 1971" (7-MODE CYCLE)

| | Exhaust gases analysis | |
|---|---|---|
| | THC ppm | % CO |
| Upstream the muffler | 640 | 3.4 |
| Downstream the muffler | 24 | 0.03 |

EXAMPLE 8

1000 g of spheroidal gamma-$Al_2O_3$ were impregnated with a solution containing 100 g of Cu $(NO_3)_2 \cdot 3\ H_2O$ in 900 cc of $H_2O$. After drying at 120°C during 12 hours the catalyst was calcined at 500°C for 2 hours. After cooling at room temperature the same was impregnated with a solution prepared by dissolving:

966 g of Co $(NO_3)_2 \cdot 6\ H_2O$ 100 g of Cu $(NO_3)_2 \cdot 3\ H_2O$ 391.5 g of Mn $(NO_3)_2$ in solution at 50%, added with 500 cc of water.

After the solution was completely absorbed by the gamma $Al_2O_3$ the drying is carried out at 120°C for 12 hours. then calcination is performed at 500°C during 2 hours. A catalyst is obtained containing about 22% b.w. of Co, Mn and Cu oxides (the atomic ratio between the elements was: $Co_4\ Cu_1\ Mn_{1.3}$).

1 cc of the catalyst so prepared was introduced into an integral flow microreactor, fed at a space velocity of 27.000 GHSV, with a gaseous mixture containing by volume:

| | |
|---|---|
| CO | 3% |
| $O_2$ | 2.5% |
| $CO_2$ | 15% |
| $C_4H_{10}$ | 700 mmp |
| $N_2$ | balance |

A resume of the performance of the catalyst is contained in the following table:

| Temperature measured on the gas entering the reactor | % CO converted | % $C_4H_{10}$ converted |
|---|---|---|
| 146°C | 90.5 | 0.9 |
| 152°C | 100 | 3 |
| 258°C | 100 | 55.6 |

EXAMPLE 9

1000 g of spheroidal gamma-$Al_2O_3$ were impregnated with a solution containing 100 g of Cu $(NO_3)_2 \cdot 3\ H_2O$ in 900 cc of $H_2O$. After drying at 120°C for 12 hours the catalyst was calcined at 700°C for 2 hours. After cooling at room temperature the same was impregnated with a solution prepared by dissolving:

966 g of Co $(NO_3)_2 \cdot 6\ H_2O$ 100 g Cu $(NO_3)_2 \cdot 3\ H_2O$ 391.5 g Mn $(NO_3)_2$ in solution at 50% added with 500 cc of water.

Afterwards the solution was completely absorbed by the gamma-$Al_2O_3$ the same was dried at 120°C for 12 hours then it was calcined at 500°C during 2 hours. A catalyst was obtained containing about 22% b.w. of Co, Mn and Cu oxides (the atomic ratio between the elements being $Co_4\ Cu_1\ Mn_{1.3}$).

1 cc of catalyst so prepared was introduced into an intergral flow microreactor at a space velocity of 27.000 GHSV, with a gaseous mixture containing by volume:

| | |
|---|---|
| CO | 3% |
| $O_2$ | 2.5% |
| $CO_2$ | 15% |
| $C_4H_{10}$ | 700 ppm |
| $N_2$ | balance |

A resume of the performance of the catalyst is contained in the following table:

| Temperature measured on the gas entering the reactor | % CO converted | % $C_4H_{10}$ converted |
|---|---|---|
| 136°C | 95.6 | 0 |
| 152°C | 100 | 1.2 |
| 170°C | 100 | 4.7 |
| 260°C | 100 | 33.6 |
| 270°C | 100 | 58.7 |

EXAMPLE 10

The gamma-$Al_2O_3$ described in the text was impregnated with a single solution containing $Cr^{+3}$, $Ni^{+2}$ and $Cu^{+2}$ according to the following procedure: 1200 g of gamma-$Al_2O_3$ were impregnated under vacuum, with a solution obtained by dissolving:

1330 g $Cr(NO_3)_3 \cdot 9 H_2O$ 410 g $Ni(NO_3)_2 \cdot 6 H_2O$ 220 g $Cu(NO_3)_2 \cdot 3 H_2O$ in 650 cc of $H_2O$ Afterwards the solution was completely absorbed by the gamma-$Al_2O_3$, it was dried at 120°C for a time sufficient to remove completely the water. Subsequently a calcination was performed in an oxidizing atmosphere at 500°C for 2 hours. A catalyst is obtained containing about 26% b.w. of Cr, Ni and Cu oxides (the atomic ratio being $Cr_3Ni_{1.4}Cu_1$).

The physical and chemical characteristics were the following:

| | |
|---|---|
| surface area | 182 m²/g |
| total porosity | 0.72 cc/g |
| mass density | 0.67 g/cc |

1 cc of said catalyst was introduced into an integral flow microreactor, fed at a space velocity of 27.000 h⁻¹, with a gaseous mixture containing:

| | |
|---|---|
| CO | 3% |
| $O_2$ | 2.5% |
| $C_4H_{10}$ | ppm |
| $N_2$ | balance |

A resume of the performance of the catalyst is contained in the following table:

| Temperature measured on the gas entering the reactor | % conversion of CO | % conversion of $C_4H_{10}$ |
|---|---|---|
| 190°C | 95 | 28 |
| 200°C | 100 | 45 |
| 210°C | 100 | 65 |
| 250°C | 100 | 90 |

Figure 2:
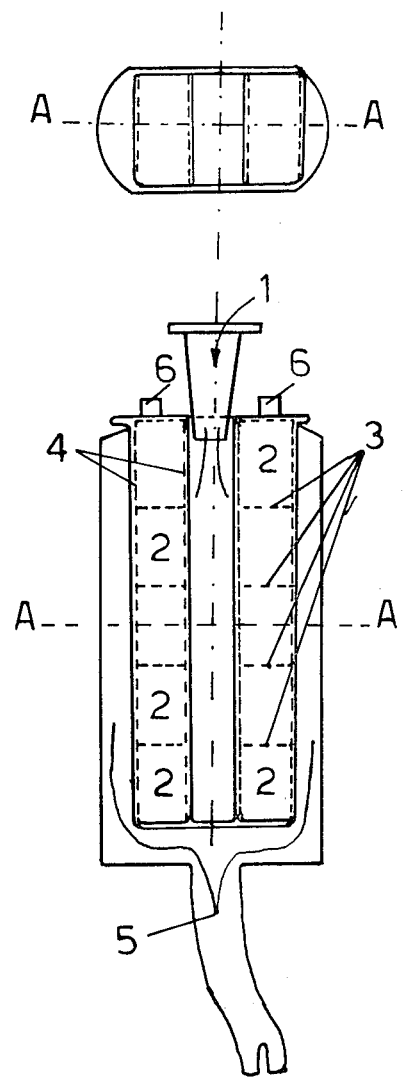

About 2 kg of the same catalyst were introduced into a radial flow catalytic muffler (FIG. 2) placed under the platform of an Alfa Romeo 1300 TI of 1300 cc stroke capacity. Supplementary air was introduced upstream the muffler. With reference to FIG. 2 of the drawing
1 represents the inlet of the exhaust gases
2 represents the zones containing the composition of the invention
3 represents perforated septa
4 represents a net for containing the catalyst
5 represents the outlet of the exhaust gases
6 represents a feeding hole with screw closing
7 represents a view in section according to the plane A—A A resume of the results obtained with such catalytic device are contained in the following tables:

"TOTAL CYCLE U.S.A. 1971" (7-MODE CYCLE)

| | Analysis of exhaust gases | |
|---|---|---|
| | a) THC ppm | CO % |
| Car without muffler | 1700 | 4.5 |
| Car with muffler and supplementary air injection | 80 | 0.08 | a. THC = total hydrocarbons

"HOT CYCLES U.S.A. 1971" (7-MODE CYCLE)

| | Exhaust gases analysis | |
|---|---|---|
| | a) THC ppm | CO % |
| Upstream the muffler | 867 | 2.2 |
| Downstream the muffler | 24 | 0.045 | a. THC = total hydrocarbons

After 9.000 km, carried out with the same car going along town streets, out of the town and on Super highways without fixed limits of speed, the performance of the catalytic device gave the following results:

"1971 U.S.A. TOTAL CYCLES" (7-MODE CYCLE)

EXHAUST GASES ANALYSIS

| THC ppm | CO % |
|---|---|
| 105 | 0.1 |

At the end of said number of kilometres there were no remarkable losses of catalytic material which presented the same initial activity.

The same catalyst was introduced into a muffler of the radial type, set on a motorcar FIAT 850 of an 850 cc stroke capacity, devoid of the supplementary air introduction device; a resume of emissions measured according to the "Europe cycle" is contained in the following table:

| | | |
|---|---|---|
| Car without catalytic muffler | THC: 4.5 g | CO: 35 g |
| Car with catalytic muffler | THC: 0.7 g | CO: 4 g |

EXAMPLE 11

With the same alumina used in example 5, a catalyst was prepared according to the following procedure. 1200 g of spheroidal gamma-$Al_2O_3$ were impregnated with 110 g of $Cu(NO_2)_3 \cdot 3 H_2O$ dissolved in 900 cc of $H_2O$.

After drying at 120°C during 12 hours the catalyst was calcined at 700°C during for 2 hours. After cooling at room temperature the same was impregnated with a solution prepared by dissolving:

1330 g $Cr(NO_3)_3 \cdot 9 H_2O$ 110 g $Cu(NO_3)_2 \cdot 3 H_2O$ 410 g $Ni(NO_3)_2 \cdot 6 H_2O$ in 650 cc of $H_2O$ After the solution was completely absorbed by the gamma-$Al_2O_3$ it was dried at 120°C for 12 hours, then it was calcined at 500°C during 2 hours. A catalyst was obtained completely similar to the one described in example 10; 1 cc of said catalyst was evaluated through the laboratory test which was precedently described.

A resume of the results of the test is contained in the following table:

| Temperature measured on the gas entering the reactor | % CO converted | % $C_4H_{10}$ converted |
|---|---|---|
| 162°C | 10 | 3.2 |
| 170°C | 100 | 50.0 |
| 184°C | 100 | 59.0 |

Said example showed in comparison with the Example 10, the favorable effect of the pre-impregnation of the alumina for a catalyst based on Cr, Cu and Ni.

EXAMPLE 12

By using the spheroidal gamma-$Al_2O_3$ a catalyst was prepared in the following way:

1000 g of spheroidal gamma-$Al_2O_3$ were impregnated under vacuum with a solution obtained by dissolving:

1050 g Cr $(NO_3)_3 \cdot 9 H_2O$ 220 g Cu $(NO_3)_2 \cdot 3 H_2O$ in 490 g of solution of Mn $(NO_3)_2$ at 50% added with 450 cc $H_2O$.

After the solution was completely absorbed by the gamma $Al_2O_3$ it was dried at 120°C for a time sufficient to remove completely the water, then it was calcined in an oxidizing atmosphere at 500°C for 2 hours. A catalyst was obtained containing about 24% b.w. of Cr, Cu and Mn oxides (the atomic ratio being $Cr_3 Cu_1 Mn_1$).

The physical chemical characteristics of the catalyst were:

| surface area | 142 m²/g |
|---|---|
| total porosity | 0.858 cc/g |
| mass specific gravity | 0.70 g/cc |

A sample of this catalyst was evaluated through the laboratory test already described.

A resume of the obtained results is contained in the following table:

| Temperature measured on the gas entering the reactor | % CO converted | % $C_4H_{10}$ converted |
|---|---|---|
| 170°C | 80 | 25 |
| 180°C | 98 | 37 |
| 190°C | 100 | 45 |
| 250°C | 100 | 90 |

About 2 kg of the same catalyst were introduced into a muffler completely similar to the one used in the example 10, and adjusted to the same car. A resume of the results obtained with such catalytic device are set forth in the following tables:

"1971 U.S.A. TOTAL CYCLES" (7-MODE CYCLE)

| | Exhaust gases analysis | |
|---|---|---|
| | THC ppm | CO % |
| Car without muffler | 17000 | 4.5 |
| Car with muffler and supplementary air injection | 75 | 0.09 |

"1971 U.S.A. HOT CYCLES" (7-MODE CYCLE)

| | Exhaust gases analysis | |
|---|---|---|
| | THC ppm | CO % |
| Upstream of the muffler | 867 | 2.2 |
| Downstream of the muffler | 24 | 0.045 |

The vehicle so fitted out covered a distance of 12.000 km; effected on town streets, extra-urban roads and superhighways with the only limit of the top speed fixed at 120km/h. At the end of 12.000 km the catalyst was physically unchanged; losses of catalystic material were not remarked and the performance of the catalytic device was as follows:

"1971 U.S.A. TOTAL CYCLES" (7-MODE CYCLE)

EXHAUST GASES ANALYSIS

| THC ppm | CO % |
|---|---|
| 85 | 0.13 |

EXAMPLE 13

A commercial eta-$Al_2O_3$ was used having the following physical-chemical characteristics:

| surface area | 110 sq.m/g |
|---|---|
| total porosity | 0.46 cc/g |
| mass specific gravity | 0.85 g/cc |

With said alumina, following the procedure described in example 5, a catalyst was prepared based on ocycompounds of Cr and Cu in the molar ratio of 1/1, the percentage of the supported oxides proved to the 16%.

A sample of said catalyst was evaluated through the already described laboratory test.

A resume of the obtained results is set forth in the following table:

| Temperature measured on the gas entering the reactor | % CO converted | % $C_4H_{10}$ converted |
|---|---|---|
| 200°C | 20 | 8 |
| 210°C | 55 | 12 |
| 230°C | 90 | 17 |
| 250°C | 100 | 25 |
| 300°C | 100 | 55 |

About 2 kg of the same catalyst were introduced into a muffler completely similar to the preceding one of the example 10 adjusted on the same type of car.

A resume of the obtained results through such catalytic device is set forth in the following table:

"1971 U.S.A. TOTAL CYCLES" (7-MODE CYCLE)

| | THC ppm | CO % |
|---|---|---|
| Car without muffler | 1.520 | 3.5 |
| Car with muffler and supplementary air injection | 165 | 0.42 |

After traveling a distance of 4.000 km with the same car on city streets, extra-urban roads and superhighways without any fixed top speed limit, the measured emissions were as follows:

"1971 U.S.A. TOTAL CYCLES" (7-MODE CYCLE)
EXHAUST GASES ANALYSIS

| THC ppm | CO % |
|---------|------|
| 251     | 0.73 |

Said catalyst based on Cr and Cu supported on alumina widely described in patent literature, shows the negligible catalytic activity at low temperature and the high level of emission which it is possilbe to obtain by means of it, as well as the rapid deactivation to which it is subjected due to the use of the catalytic muffler, assembled on a motor vehicle.

The aforesaid subject matter relates to the invention respecting the abatement of the noxious gases contained in the exhaust gases. However it is to be noted that, among them, there is NO too: the following description will illustrate the invention also from the point of view of abating such gas.

In fact it is well-known that the problem of atmospheric pollution caused by the noxious components found in motor vehicle exhaust gases is being faced with earnest research all over the world. The great efforts to find suitable solutions to limit the emission of such gases on the part of the major industries involved, are justified by the worrying point which this situation has reached, especially in large urban centres, which in addition to representing a source of mutation of the ecological system, is also a dangerous hazard to health. It is known that the most noxious of the substances given off by the exhaust systems of motor vehicles are carbon monoxide, unoxidized or partially oxidized hydrocarbons and nitrous oxide.

Whilst the first attempts at solving the problem of pollution were directed exclusively at reducing the carbon monoxide and hydrocarbons, at the present time also the nitrous oxides are being taken into close consideration. The latter take part in many photochemical reactions in the atmosphere and are chiefly to blame for the formation of several kinds of smog which in turn lead to many physiological and phytotoxic manifestations.

Of the possible nitrous oxides involved, those of importance from a pollution point of view, are NO and $NO_2$.

The nitrous oxide $N_2O$ does not have a noxious effect when in low concentrations and its presence in the exhaust gases is limited, as for that matter, is the presence of nitrous tetroxide $N_2O_4$, the dimer form of $NO_2$.

On the other hand, the presence of NO in the exhaust gases is very extensive and its concentration may be of from a few parts per million to several thousands of p.p.m.; it originates from the reaction which takes place in the combustion chamber of the engine, between $N_2$ and $O_2$ and its formation depends mainly on the temperature and the quantity of air present therein. Then, in the atmosphere, this NO slowly oxidises, even at room temperature, to form $NO_2$.

The control of the emission of $NO_x$ ($NO + NO_2$) by motor-engineering means, as is presently adopted, is neither easily carried out nor completely satisfactory since, for example, an increased air-combustible relationship, which favours the reduction of $NO_x$ discharges, results in very bad performance of the vehicle with a consequent accelerated deterioration of the engine parts. It has also been attempted to lower the compression relationship and to delay ignition, but such conditions, whilst on the one hand lowering the level of $NO_x$, on the other lead to a net efficiency loss with regard to the engine. Other attempts, making use of the partial re-circulation of the exhaust gases, have been made; in fact, in this manner it is possible to slightly reduce the discharges of $NO_x$; similarly in this case, however, the performance of the vehicle is affected Moreover, on the other hand, several motor-engineering means which favour a reduction of $NO_x$ discharges, do not allow for the control of CO and HC (high air/combustible relationship: HC = hydrocarbons) emission. The only effective menas of limiting $NO_x$ discharges is that using catalysts. The system for eliminating nitrous oxide in the exhaust gases makes use of catalysts which promote the following reactions:

$$NO + CO \rightarrow \tfrac{1}{2}N_2 + CO_2$$

$$NO + CO \rightarrow H_2O + \tfrac{1}{2}N_2$$

which result in the formation of non-noxious products. Alongside these reactions, the catalyst may promote the formation of $NH_3$ which fins its origin in the inter-reaction between NO and $H_2$, in accordance with the reaction:

$$NO + 5/12 H_2 \rightarrow NH_3 + H_2O$$

The task of eliminating CO, HC and $NO_x$ can be finally resolved through the use of catalytic converters, or more specifically, by using a muffler equipped with two catalytic beds; the first bed being a reducer, in which NO is reduced to $N_2$, and the second being oxidising, where the final oxidization of the CO and HC to $CO_2$ and $H_2O$ takes plate as a result of the introduction of air immediately below the first bed and above the second.

This type of solution is the most promising and accepted, even through it often presents a draw-back represented by the fact that $HN_3$ is produced in the first bed, being therefore, a negative factor in the general economy of the reduction of the NO, as any $NH_3$ which may be produced in the reduction bed will be once again oxidised to NO (or $NO_2$ in the oxidising bed. Therefore, even when catalyst are used, the problem is not one to be easily resolved, since the catalysts themselves must meet certain requisites which are not of easy co-existence; they must substantially be:

a. active at relatively low temperatures and at very high space-velocities;

b. resistent at high temperatures and for very long periods of time;

c. resistent to physical stress;

d. able to selectively convert the $NO_x$ into $N_2$;

e. resistent to poisoning by the substances present in the exhaust gases;

Various types of catalysts and solutions for the limitation of the emission of $NO_x$ have been illustrated in several patents.

The catalysts which are most active in reducing the $NO_x$ would seem to be those made up of mixtures of metal oxides of the transition group, either mixed amongst themselves or with alkaline metal oxides of the rare earth group U.S. Pat. Nos. 3.398.101, 3.429.656, 3.476.508, 3.483.138.

The catalytic properties of these oxides in the oxidization of the noxious components of exhaust gases, are well-known; several of such oxides are also active with regard to the reduction, in some means of reduction, of $NO_x$. Generally, however, the practical application of these catalysts is hindered by their insufficien resistence to mechanical stresses and the speed with which they lose their catalytic validity.

The use of metal catalysts, namely alloys based on Cu, Ni (for example MONEL), has also been tested. These types of catalysts are active at high temperatures, but also in this case, their utilization is limited by their physical deterioration; moreover such catalysts bring about, to some considerable degree, the production of $NH_3$.

It has been found that by using the inventive process, the aforesaid drawbacks are widely overcome.

The preocedure of the invention may be employed also when it consists of the passing of the exhaust gases through a reaction area in the presence of the catalytic compositions described hereinabove, providing for at least part of the reaction to take place in oxidising conditions, that is for said reaction to begin in reducing conditions and then continue in oxidising conditions. In this connection, it is only necessary to provide for the introduction of an oxidising gas (oxygen, air or others) at least during the second treatment of the reaction area. Logically, the reaction area may be divided into more than one zone, with at least one of said zones being destined to begin the procedure of reduction of the exhaust gases, to be continued in at least one of the other zones where the reaction is brought about in oxidizing conditions due to the introduction of the oxidizing gas.

The invention therefore provides for the complete reduction of noxious gases contained in the exhaust fumes of an automobile, by means of a new and simple application of the procedure afore described. The new application consists of bringing into action the catalytic reactor in at least one initial phase in reducing conditions, and in at least one second phase in oxidising conditions. These latter conditions may be attained, for example simply by means of the introduction of oxygen or other gases containing oxygen, for example air, immediately below the first area and above the second.

The catalytic compositions used in the reactor may be the same, or different, for both areas, or in the case of there being more than two areas such compositions may be the same for all the zones or different for each one. The catalytic compositions of the invention may also be combined with, or replaced by, but in the latter case only partially, other conventional catalytic compositions. These alternatives are easily achieved and present no difficulties for the qualified technician who has at his disposal all those elements necessary for the evaluation of the composition, or combination of compositions, to be chosen.

Another alternative consists of operating initially in a completely oxidizing atmosphere, to then go on to the reduction of the gases by moving the point of introduction of the oxidising gas, in order that a first part of the reactor operates in reducing conditions and the latter in oxidising conditions. This method of operation is particularly advantageous in the conditions created at the time of starting up the engine, that is, when the oxidising gas (in the absence of pre-heating) would provoke intensive cooling of the exhaust gases in the course of their reduction; it is obvious that under continuous running conditions, this cooling would have no practical consequences due to the greater temperature of the exhaust gases.

The advantages of the invention will be illustrated in the following examples, which should not, however, be considered as limitations of the same.

EXAMPLE NO. 14

A catalyst is prepared in the following manner:

100 g of spheroidal $\gamma$ $Al_2O_3$ (prepared in accordance with the specification of example 5), having a diameter of 2–3 mm, are impregnated with a solution obtained by dissolving 30 g of $CrO_3$, 40 g of $Ni(NO_3)_2 6H_2O$ and 24 g of Cu $(NOhd 3)_2 3H_2O$ in water, the total volume of the solution being increased to 80 cc. Following the impregnation, the material is dried for 24 hours at 110°C. Then a portion of same is calcined in air at 500°C for 4 hours, the other portion is calcined at 900°C for 48 hours. Samples of the two portions are then put into an electrically heated micro-reactor, at different times; a synthetic mixture made up of the following is then fed into same:

| | | |
|---|---|---|
| CO | 3% | in volume |
| $CO_2$ | 12% | in volume |
| NO | 1500 ppm | in volume |
| $C_4H_{10}$ | 350 ppm | in volume |
| $N_2$ | remainder to 100% | | at space-velocities of between 22.000 and 285.000$h^{-1}$ and at temperatures of from 200°C to 500°C.

The analysis of the NO present in the outflowing gas is carried out by means of an infra-red analytical unit. The results obtained are listed in TABLE 1.

TABLE 1

| Temperature of Test °C | GHSV $h^{-1}$ | Reduction NO: Catalyst calcin. 500°C | % conversion Catalyst calcin. 900°C |
|---|---|---|---|
| 200 | 22.000 | 50.2 | — |
| 250 | 22.000 | 98.9 | — |
| 200 | 39.000 | 24.3 | — |
| 250 | 39.000 | 40.5 | 50.1 |
| 300 | 39.000 | 98.9 | 100.0 |
| 320 | 39.000 | 100.0 | 100.0 |
| 250 | 285.000 | 10.5 | 11.2 |
| 300 | 285.000 | 22.2 | 24.3 |
| 350 | 285.000 | 41.5 | 39.2 |
| 400 | 285.000 | 60.5 | 65.3 |
| 450 | 285.000 | 77.5 | 75.2 |
| 500 | 285.000 | 90.5 | 94.3 |

The catalyst calcined at 900°C for 48 hours is immersed in a twobedded micro-reactor: the first bed being reducing, which is fed with a synthetic gasseous mixture containing:

| | | |
|---|---|---|
| CO | 3% | in volume |
| $CO_2$ | 12% | in volume |
| NO | 1500 ppm | in volume |
| $H_2$ | 1% | in volume |
| $N_2$ | remainder to 100% | in volume | the second bed is rendered oxidizing by means of the introduction of $O_2$ in such a quantity as to guarantee a 3% concentration in the mixture. The space-velocity on each catalytic bed is equal to 40.000$h^{-1}$.

The analysis of the outflowing gas, when the temperature of the reducing bed is 400°C and that of the oxidising bed is 550°C, has supplied results which indicate that the total conversion of the NO is in the region of 90% – 95%, and therefore the production of $NH_3$ in the reducing bed is limited to negligible quantities.

TABLE 2

| Catalyst | Results of tests with two catalytic beds | | %O$_2$ Remainder |
|---|---|---|---|
| | Conv. CO % | Conv. NO % | |
| LM8B | 100 | 95 ÷ 100 | 0.3 ÷ 0.5 |

EXAMPLE NO. 15

A sample MONEL 400 alloy is introduced into the same micro-reactor used in the previous example; the same synthetic mixture is added; the results obtained are noted in TABLE 3.

TABLE 3

| Temperature °C | GHSV h$^{-1}$ | % Reduction NO |
|---|---|---|
| 300 | 140.000 | 23.2 |
| 350 | 140.000 | 34.9 |
| 400 | 140.000 | 58.9 |
| 450 | 140.000 | 80.0 |
| 500 | 140.000 | 94.3 |
| 400 | 285.000 | 41.2 |
| 450 | 285.000 | 56.2 |
| 500 | 285.000 | 71.5 |
| 550 | 285.000 | 95.0 |

The same catalyst subjected to two bed tests, using the catalyst of the previous example as an oxidant, manifests a high rate of activity as far as the production of ammonia is concerned, since the final reduction of NO fluctuates between 60% and 65%. (GHSV = Gas Hourly Space-Velocity)

EXAMPLE NO. 16

A sample of 1100 cc of catalyst prepared in the same way as for Example 14 was introduced into a radial flow muffler fixed to a 1330 cc cylinder automobile, (Alfa Romeo 1300 TI). The muffler was positioned underneath the vehicle, replacing the first.

The automobile, without the second oxidising muffler and therefore without supplementary air injection pump, carried out U.S.A. 71 running cycles. The emission results are indicated in TABLE 4.

The determination of the amount of NO$_x$ was obtained using Thermo Electron chemiluminescent apparatus in such operative conditions as to allow for the calculation of any NH$_3$ produced.

TABLE 4

U.S.A. 71 Running Hot Cycles on A.R. 1300 TI Automobile

| Type of Test | HC (ppm) | | CO(%) | | NO(ppm) | | Reduction(%) | | | Temperature of Test °C |
|---|---|---|---|---|---|---|---|---|---|---|
| | AB | BM | AB | BM | AB | BM | HC | CO | NO | |
| Average O$_2$ AM | 728 | 316 | 2.3 | 1.15 | 1182 | 307 | 57 | 50 | 74 | 610 – 620 |
| 0,75% | 809 | 300 | 2.5 | 1.26 | 1154 | 289 | 62 | 50 | 75 | 610 – 620 |
| Average O$_2$ AM | 820 | 469 | 4.5 | 3.5 | 859 | 151 | 43 | 20 | 83 | 610 – 630 |
| 0,5% | 864 | 528 | 4.24 | 3.64 | 643 | 97 | 40 | 18 | 85 | 610 – 620 |
| Average O$_2$ AM | 835 | 234 | 4.95 | 2.45 | 521 | 76 | 72 | 50 | 86 | 700 – 730 |
| | 857 | 451 | 4.75 | 3.53 | 608 | 100 | 48 | 25 | 84 | 610 – 680 |

AM = above muffler
BM = below muffler

EXAMPLE NO. 17

The same volume of catalyst as in the previous example was introduced into a radial flow muffler positioned immediately below the engine, after the exhaust manifolds.

Again in this case, due to the absence of the second oxidising muffler, supplementary air was not fed in. The automobile (a FIAT 125) carried out U.S.A. 1971 and 1973 cycles on a dynamometer.

The emission data of the NO$_x$ are indicated in TABLES 5 and 6.

TABLE 5

Automobile: FIAT 125
U.S.A. 1971 Cycle Test

| Test | AM Emission | | | BM Emission | | | Temperature Cat. °C |
|---|---|---|---|---|---|---|---|
| | HC g/mi | CO g/mi | NO$_x$ g/mi | HC g/mi | CO g/mi | NO$_x$ g/mi | |
| 1 | 4.4 | 35.7 | 3.3 | 1.3 | 21.1 | 0.56 | 680 |
| 2 | 3.8 | 54.6 | 2.4 | 2.5 | 43.3 | 0.18 | 700 |
| 3 | — | — | — | 3.4 | 84.7 | 0.22 | 650 |
| 4 | — | — | — | 2.6 | 57.2 | 0.20 | 650 |

1) U.S.A. 71 Cycle - complete with normal carburation
2) U.S.A. 71 Cycle - running with normal carburation
3) U.S.A. 71 Cycle - complete with oily carburation

TABLE 6

U.S.A. 73 Cycle Test

| | Above Muffler | | | Below Muffler | | | Temperature °C |
|---|---|---|---|---|---|---|---|
| | HC g/mi | CO g/mi | NO$_x$ g/mi | HC g/mi | CO g/mi | NO$_x$ g/mi | |
| 1 | 5.28 | 65.88 | 3.5 | 3.46 | 59.38 | 0.4 | 600 |
| 2 | 6 | 90 | 2.5 | 5.50 | 83.74 | 0.2 | 600 |

1) Normal carburation
2) Oily carburation

In TABLES 5 and 6, g/mi means grammes/mile

What we claim is:

1. Supported catalytic composition adapted to catalyze the oxidation of carbon monoxide and hydrocarbons contained in the exhaust gases of an internal combustion engine, comprising:
  a. a carrier constituted by gamma-alumina having a spheroidal shape, high porosity between 0.5 and 1.0 cc/g, a high specific area between 150 and 350 m²/g, high mechanical resistance and low mass specific gravity; and
  b. an active part constituted by a catalytic composition selected from the group consisting of members represented by the formulae:
  Cu Ni$_{1.4}$Cr$_3$O$_{[6.9]}$w;
  Cu Mn Cr$_3$O$_{[7.5]}$w; and
  Cu Mn$_{1-2}$Co$_{1-6}$O$_{[4.5-14]}$w.
wherein w is the index for the quantity of oxygen required to satisfy the valences of the metals.

2. Supported catalytic composition adapted to catalyze the oxidation of exhaust gases of an internal combustion engine according to claim 1 wherein the carrier before the treatment with the active part was subjected to a pre-impregnation with solutions of salts of metals selected from the bivalent metals Ni, Cu, Co and Mn, and chromium.

3. Catalytic composition, adapted to catalyze the oxidation of carbon monoxide and hydrocarbons contained in the exhaust gases of an internal combustion engine, selected from the group consisting of members represented by the following formulae:

Cu Ni$_{1.4}$     Cr$_3$     O$_{[6.9]w}$;
Cu Mn          Cr$_3$     O$_{[7.5]w}$; and
Cu Mn$_{1-2}$     Co$_{1-6}$  O$_{[4.5-14]w}$.

wherein w is the index for the quantity of oxygen required to satisfy the valences of the metals.

4. Catalytic composition according to claim 3 wherein the member represented by the formula Cu Mn$_{1-2}$Co$_{1-6}$O$_{[4.514]}$w is selected from the area a b c d of FIG. 1 of the drawing.

5. Process for the preparation of a catalytic composition according to claim 3 comprising:
  a. the preparation of an aqueous solution of salts of metals selected from nickel, cobalt, copper, manganese and chromium said compounds being capable of supplying oxides upon thermal decomposition and being present in the solution in quantities adapted to obtain the ratio for the metals set forth in the formula therefor;
  b. removing then from the solution the solvent, separating in this way a solid residue;
  c. isolating from the solid residue the catalytic composition corresponding to the formula therefor for the removal after thermal decomposition of the elements different from oxygen and the metals;
  d. calcining then the compounds of the metals as obtained according to c).

6. Process according to claim 5 wherein the solvent is water and the salts of the metals are selected respectively from the acetates and nitrates of chronium and nitrates of cooper and nickel; the removal of the water taking place through the heating to a temperature between 80° and 120°C; the removal of nitrogen oxides taking place also by means of heating to a temperature of about 250°C and the operation of calcination at the end being carried out at temperatures between 500° and 800°C.

7. Process according to claim 6 wherein the metal salts are selected from the acetates and nitrates of copper, manganese and chromium.

8. Process according to claim 6 wherein the metal salts are selected from the nitrates of cobalt, manganese and copper.

9. Process for the preparation of supported catalytic compositions according to claim 1 comprising;
  a. preparing an aqueous solution of the salts of the metals in such ratios as to supply the quantities thereof set forth in the formula therefor;
  b. impregnating with the solution according to a) a carrier constituted by gamma-alumina of spheroidal shape, with a high porosity, large surface area and high mechanical properties;
  c. calcining the carrier so impregnated at temperatures lower than the sintering temperature of the carrier.

10. Process for preparing a supported catalytic composition according to claim 7 comprising:
  a. preparing an aqueous solution of the metal salts in such quantities as to obtain the ratio set forth in the formula therefor;
  b. pre-impregnating the carrier constituted by gamma-alumina of a spheroidal shape, with high porosity, a large surface area and high mechanical properties, with a solution of a salt selected from those of the bivalent metals Ni, Cu, Coo and Mn, and of chromium;
  c. drying the pre-impregnated carrier obtained according to b);
  d. calcining the carrier obtained according to c) at temperatures lower than the sintering temperature of the carrier.
  e. treating the carrier obtained according to d) with a solution obtained according to a);
  f. drying the carrier obtained according to e);
  g. calcining the carrier obtained according to f) at temperatures lower than the sintering temperature of the carrier itself.

11. Process according to claim 10 wherein the solvent used for the states 1) and b) is water, the stages of drying taking place at temperatures between 80° and 120°C.

12. Process according to claim 11 wherein the pre-impregnation takes place with a solution of a compound of copper, nickel, manganese, or chromium and the impregnation takes place with a solution of compounds of chromium, copper, manganese or a solution of compounds of chromium, copper and nickel.

13. Process according to claim 11 wherein the pre-impregnation takes place with solutions of compounds of cobalt and/or copper and the solution of impregnation is a solution of the compounds of cobalt, manganese and copper.

* * * * *

UNITED STATES PATENT AND TRADEMARK OFFICE
CERTIFICATE OF CORRECTION

PATENT NO. : 3,929,681
DATED : December 30, 1975
INVENTOR(S) : Franco Buonomo, et al It is certified that error appears in the above—identified patent and that said Letters Patent are hereby corrected as shown below:

Col. 2, line 41, change "by" to -- from --.

Col. 4, line 49, change the line to read:

$$-- Cr_z \, CuMn_{1-2} \, O_w \, --,$$

line 55, "Z" should read -- z --.

Col. 8, line 4, change "4.-100 mesh" to read

-- 40 - 100 mesh --.

Col. 9, line 41, after "special" correct "trivances" to read

-- contrivances --, line 51, delete "and.

Col. 11, line 11, after "formulations" delete "from", line 20, correct "$O_{17.8}$" to read -- $O_w$ --, line 43, after "formulations" delete "from", line 49, correct "$al_2O_3$" to read -- $Al_2O_3$ --.

UNITED STATES PATENT AND TRADEMARK OFFICE
CERTIFICATE OF CORRECTION

PATENT NO. : 3,929,681
DATED : December 30, 1975
INVENTOR(S) : Franco Buonomo, et al It is certified that error appears in the above-identified patent and that said Letters Patent are hereby corrected as shown below:

Col. 14, line 11, after "hours" change the period "." to a comma -- , --.

Col. 16, line 56, after "700°C" delete "during".

Col. 18, line 13, correct "catalystic" to read -- catalytic --, line 35, correct "ocycompounds" to read -- oxycompounds --, line 36, delete "the" (last occurrence), line 37, before "16%" insert -- be --.

Col. 20, line 9, after "fected" insert a period -- . --, line 13, correct the spelling of "means", line 20, correct the line to read:

-- $NO + H_2 \longrightarrow H_2O + \frac{1}{2} N_2$ --, line 23, correct spelling of "finds", line 34, change "plate" to -- place --,

UNITED STATES PATENT AND TRADEMARK OFFICE
CERTIFICATE OF CORRECTION

PATENT NO. : 3,929,681
DATED : December 30, 1975
INVENTOR(S) : Franco Buonomo, et al It is certified that error appears in the above-identified patent and that said Letters Patent are hereby corrected as shown below:

Col. 20, line 39, correct "HN$_3$" to read -- NH$_3$ --, line 43, after "(or NO$_2$" close the parenthesis --)--, line 45, change "resolved" to read -- solved --.

Col. 21, line 2, correct spelling of "insufficient".

Col. 22, line 11, correct "Cu (NOhd3)$_2$3H$_2$O" to read

-- Cu (NO$_3$)$_2$3H$_2$O --.

Col. 25, line 37, correct "Mn$_{1-2}$Co$_{1-6}$O[4.514]w" to read

-- Mn$_{1-2}$Co$_{1-6}$O[4.5-14]w --.

Col. 26, line 25, change "claim 7" to read -- claim 2 --, line 33, correct "COO" to read -- Co --, line 47, correct "states 1)" to read -- stages a) --.

Signed and Sealed this eighth Day of June 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,929,681
DATED : December 30, 1975
INVENTOR(S) : Buonomo et al

It is certified that error appears in the above-identified patent and that said Letters Patent are hereby corrected as shown below:

Col. 25, line 11, rewrite "Cu $Ni_{1.4}Cr_3O[_{6.9}]w$" as --Cu $Ni_{1.4}Cr_3O_w$--;

Col. 25, line 12, rewrite "Cu Mn $Cr_3O[_{7.5}]w$" as --Cu Mn $Cr_3O_w$--;

Col. 25, line 13, rewrite "Cu $Mn_{1-2}Co_{1-6}O[4.5-14]w$" as --Cu $Mn_{1-2}Co_{1-6}O_w$--

Col. 25, line 37, rewrite "$Mn_{1-2}Co_{1-6}O[4.514]w$" as --$Mn_{1-2}Co_{1-6}O_w$--

Signed and Sealed this

Sixteenth Day of May 1978

[SEAL]

Attest:

RUTH C. MASON
Attesting Officer

LUTRELLE F. PARKER
Acting Commissioner of Patents and Trademarks